(12) United States Patent
Wu

(10) Patent No.: US 11,859,694 B2
(45) Date of Patent: Jan. 2, 2024

(54) LINEAR ACTUATOR AND LINEAR ACTUATOR ASSEMBLING METHOD

(71) Applicant: J-STAR MOTOR INDUSTRIAL CO., LTD., Taichung (TW)

(72) Inventor: Wei-Fan Wu, Taichung (TW)

(73) Assignee: J-STAR MOTOR INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 17/643,589

(22) Filed: Dec. 9, 2021

(65) Prior Publication Data

US 2022/0221034 A1 Jul. 14, 2022

(30) Foreign Application Priority Data

Jan. 11, 2021 (CN) .......................... 202110030339.6

(51) Int. Cl.
  *F16H 25/00* (2006.01)
  *F16H 25/20* (2006.01)
  *F16H 25/24* (2006.01)

(52) U.S. Cl.
  CPC ....... *F16H 25/20* (2013.01); *F16H 2025/209* (2013.01); *F16H 2025/2031* (2013.01); *F16H 2025/2081* (2013.01); *F16H 2025/2481* (2013.01)

(58) Field of Classification Search
  CPC ............. F16H 25/20; F16H 2025/2031; F16H 2025/2081; F16H 2025/209; F16H 2025/2481
  See application file for complete search history.

(56) References Cited

U.S. PATENT DOCUMENTS

| | | | | |
|---|---|---|---|---|
| 4,858,481 A | * | 8/1989 | Abraham | H02K 11/25 318/473 |
| 6,240,797 B1 | * | 6/2001 | Morishima | F16H 25/2454 188/134 |
| 9,989,133 B2 | * | 6/2018 | Wu | F16H 1/203 |
| 2008/0289442 A1 | * | 11/2008 | Kawada | F16H 25/20 74/473.12 |
| 2018/0100523 A1 | * | 4/2018 | Fenn | F15B 15/088 |
| 2018/0187759 A1 | * | 7/2018 | Smith | H02P 29/032 |
| 2018/0266530 A1 | * | 9/2018 | Alfano | H01R 13/5202 |
| 2021/0030164 A1 | * | 2/2021 | Müller | A47C 20/041 |

FOREIGN PATENT DOCUMENTS

| | | | |
|---|---|---|---|
| CN | 104160176 A | 11/2014 | |
| FR | 3016012 A1 | * 7/2015 | ............. B60T 13/02 |
| TW | M369950 U | 12/2009 | |
| TW | M499491 U | 4/2015 | |

* cited by examiner

*Primary Examiner* — Zakaria Elahmadi
(74) *Attorney, Agent, or Firm* — CKC & Partners Co., LLC

(57) ABSTRACT

A linear actuator assembling method includes a semi-finished product assembling step and a threaded shaft assembling step. The semi-finished product assembling step is to form a semi-finished product, and the semi-finished product includes a case, a main gear, and a main gear bearing. The main gear and the main gear bearing are surrounded and restricted by the case, and the main gear bearing is sleeved on the main gear. In the threaded shaft assembling step, a threaded shaft is reversely assembled, and one end of the threaded shaft is inserted into the main gear to allow the end of the threaded shaft to be restricted by the main gear.

11 Claims, 6 Drawing Sheets

LINEAR ACTUATOR AND LINEAR ACTUATOR ASSEMBLING METHOD

RELATED APPLICATIONS

This application claims priority to China Application Serial Number 202110030339.6, filed Jan. 11, 2021, which is herein incorporated by reference.

BACKGROUND

Technical Field

The present disclosure relates to a linear actuator and a linear actuator assembling method. More particularly, the present disclosure relates to a linear actuator having a threaded shaft and a linear actuator assembling method.

Description of Related Art

The most common linear actuator drives a threaded shaft to allow a driven object to move linearly relative to the linear actuator, which leads to a wide use in a lot of fields. A motor is usually adapted by the linear actuator to provide power, and different transmission elements can be employed to change the power transmitting conditions, e.g., the direction and the output ratio, based on demands. The linear actuator can further include controllers for detecting or adjusting the power output, and the complex elements lead to difficulty for assembling the linear actuator.

In addition, the scale of the threaded shaft is changed based on the demands, and the linear actuator is allowed to be assembled after the scale of the threaded shaft is confirmed; therefore, the manufacture efficiency is low.

Based on the above problems, how to increase the assembly efficiency and convenience of the linear actuator becomes a pursued target for practitioners.

SUMMARY

According to one aspect of the present disclosure, a linear actuator assembling method includes a semi-finished product assembling step and a threaded shaft assembling step. The semi-finished product assembling step is to form a semi-finished product, and the semi-finished product includes a case, a main gear, and a main gear bearing. The main gear and the main gear bearing are surrounded and restricted by the case, and the main gear bearing is sleeved on the main gear. In the threaded shaft assembling step, a threaded shaft is reversely assembled, and one end of the threaded shaft is inserted into the main gear to allow the end of the threaded shaft to be restricted by the main gear.

According to another aspect of the present disclosure, a linear actuator includes a semi-finished product and a threaded shaft. The semi-finished product includes a case, a driving module, and a transmission module. The case defines an inner space, and the driving module is disposed within the inner space and includes a motor. The transmission module is disposed within the inner space and includes a main gear driven by the motor and a main gear bearing sleeved on the main gear. One end of the threaded shaft is inserted into and restricted by the main gear.

BRIEF DESCRIPTION OF THE DRAWINGS

The disclosure can be more fully understood by reading the following detailed description of the embodiments, with reference made to the accompanying drawings as follows.

DETAILED DESCRIPTION

It will be understood that when an element (or mechanism or module) is referred to as being "disposed on", "connected to" or "coupled to" another element, it can be directly disposed on, connected or coupled to another element, or it can be indirectly disposed on, connected or coupled to another element, that is, intervening elements may be present. In contrast, when an element is referred to as being "directly disposed on", "directly connected to" or "directly coupled to" another element, there are no intervening elements present.

In addition, the terms first, second, third, etc. are used herein to describe various elements or components, these elements or components should not be limited by these terms. Consequently, a first element or component discussed below could be termed a second element or component.

Figure 1:
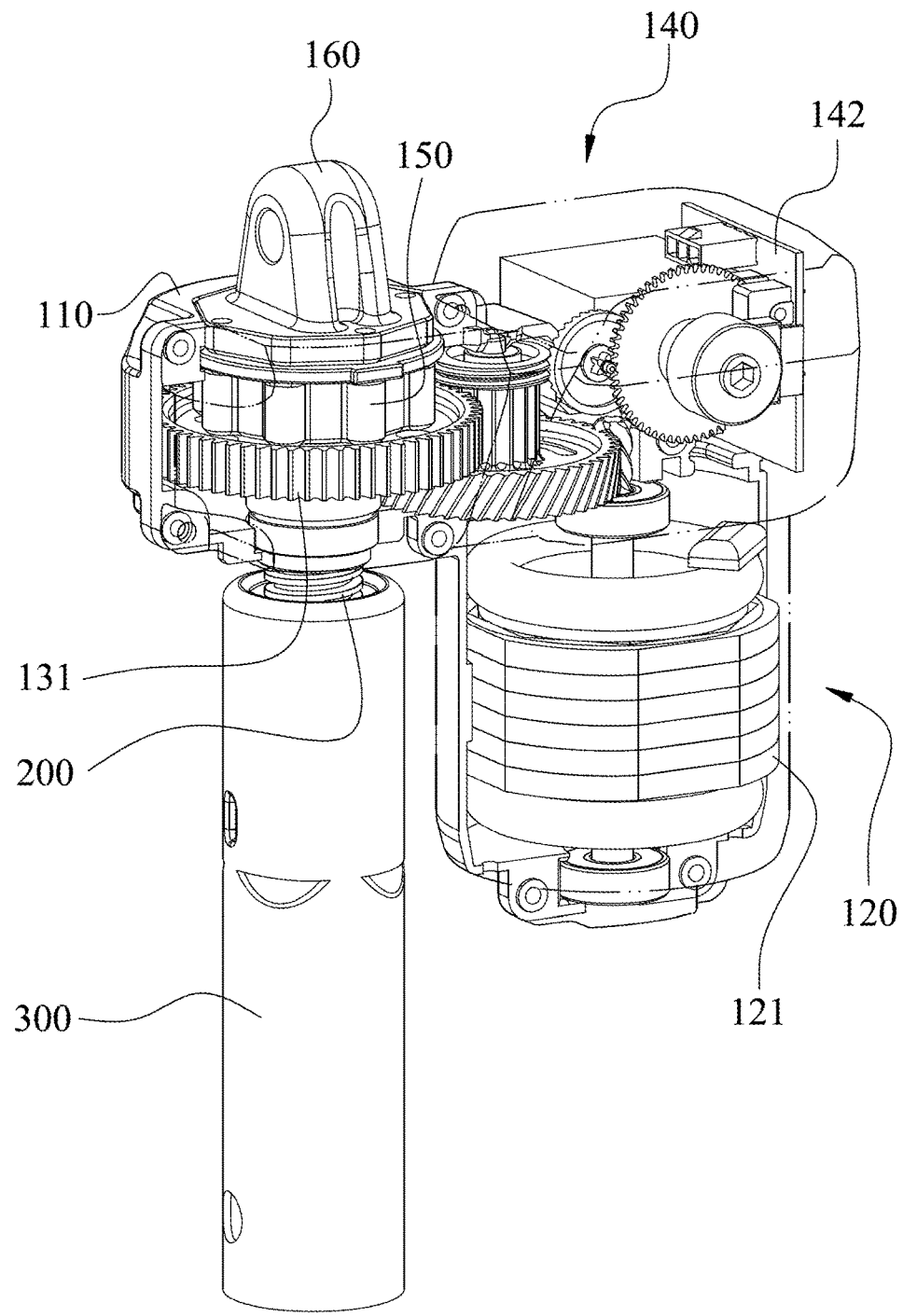
FIG. 1 shows a three-dimensional schematic view of a linear actuator according to one embodiment of the present disclosure.
Figure 2:
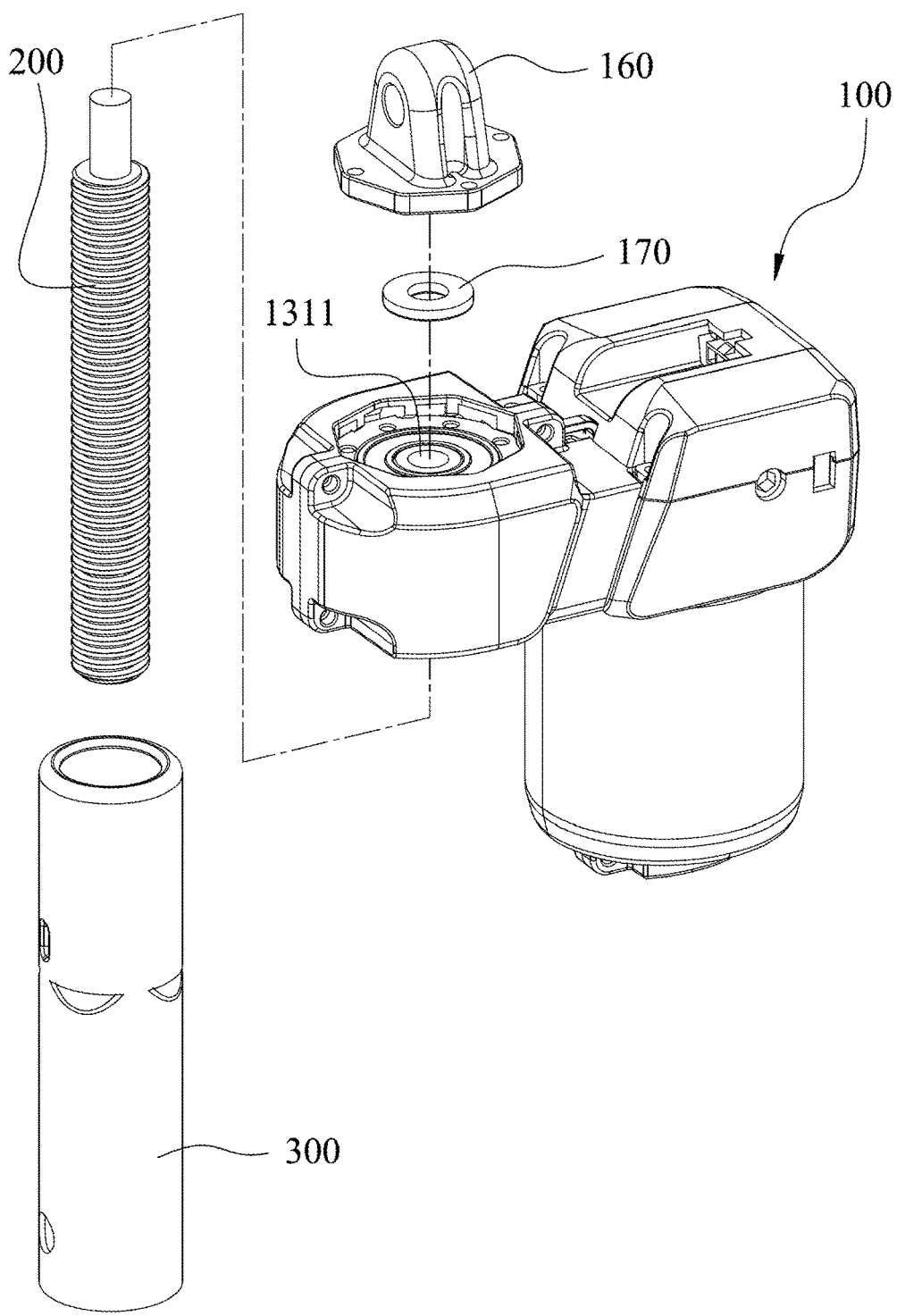
FIG. 2 shows one partial exploded view of the linear actuator of the embodiment of FIG. 1.
Figure 3:
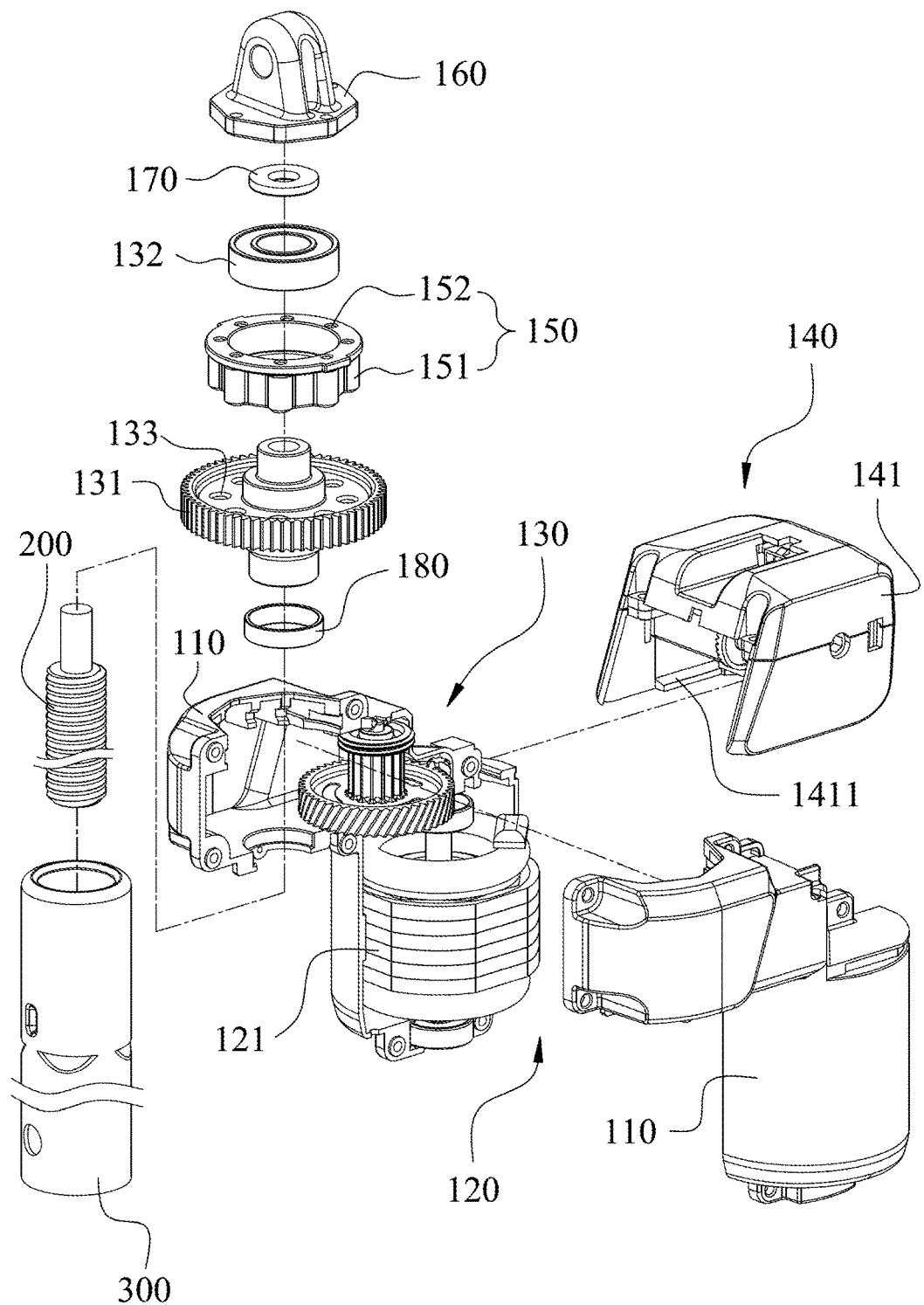
FIG. 3 shows another partial exploded view of the linear actuator of the embodiment of FIG. 1.

FIG. 1 shows a three-dimensional schematic view of a linear actuator 10 according to one embodiment of the present disclosure. FIG. 2 shows one partial exploded view of the linear actuator 10 of the embodiment of FIG. 1. FIG. 3 shows another partial exploded view of the linear actuator 10 of the embodiment of FIG. 1. Please refer to FIGS. 1, 2 and 3, the linear actuator 10 includes a semi-finished product 100 and a threaded shaft 200. The semi-finished product 100 includes a case 110, a driving module 120, and a transmission module 130. The case 110 defines an inner space, and the driving module 120 is disposed within the inner space and includes a motor 121. The transmission module 130 is disposed within the inner space and includes a main gear 131 driven by the motor 121 and a main gear bearing 132 sleeved on the main gear 131. One end of the threaded shaft 200 is inserted into and restricted by the main gear 131. A bushing 180 can be sleeved on one side of the main gear 131. When assembling the semi-finished product 100 and the threaded shaft 200, the threaded shaft 200 can be inserted from the abovementioned side of the main gear 131 into the main gear 131 and then can be restricted thereby. The main gear bearing 132 is in association with the bushing 180 to allow the main gear 131 to rotate stably about one axis. In addition, the main gear 131 can further include an engaging hole 1311 having an inner thread (not shown) configured for the threaded shaft 200 to screw therewith, thereby linking the threaded shaft 200 and the main gear 131.

Hence, because the semi-finished product 100 can be manufactured in advance, the threaded shaft 200 that is suitable for the demands can then be chosen and assembled, and the assembling efficiency and convenience of the linear actuator 10 can be increased.

Figure 4:
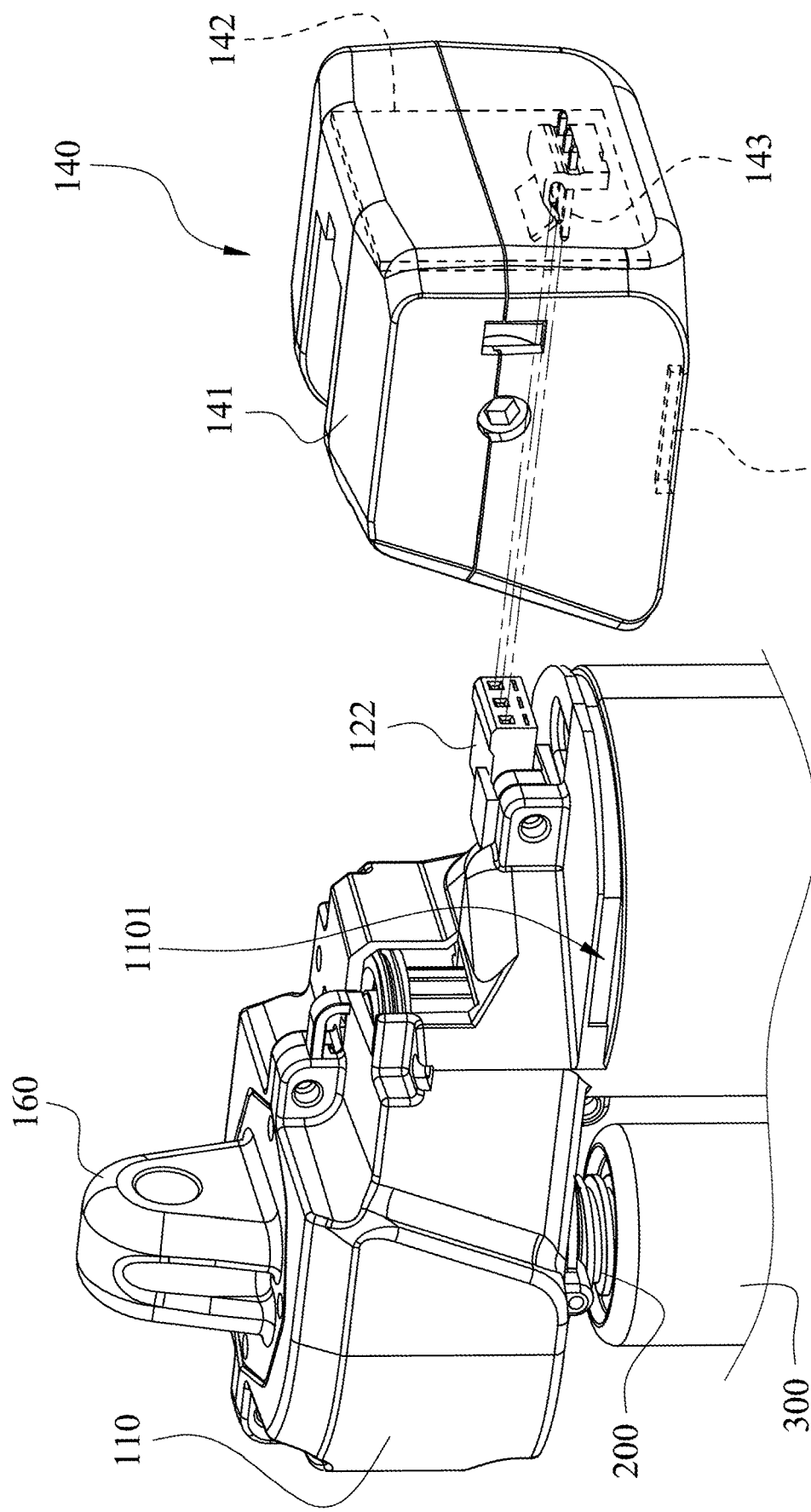
FIG. 4 shows a three-dimensional schematic view of an alignment of a distance adjusting module of the linear actuator of the embodiment of FIG. 1.

FIG. 4 shows a three-dimensional schematic view of an alignment of a distance adjusting module 140 of the linear actuator 10 of the embodiment of FIG. 1. Please refer to FIG. 4 with reference to FIG. 3, the semi-finished product 100 can further include a distance adjusting module 140 configured to defect the elevating distance of the threaded shaft 200. The distance adjusting module 140 is detachably disposed at the case 110 and includes a module housing 141 and a circuit board 142. The circuit board 142 is received within the module housing 141. When the distance adjusting module 140 is assembled with the case 110, the circuit board 142 is electrically connected to the driving module 120. The circuit board 142 can include micro switches (not shown), and the distance adjusting module 140 can further include a slave wheel (not labeled) to be engaged with the gear of the driving module 120.

As shown in FIGS. 3 and 4, the driving module 120 can further include a connecting portion 122 electrically connected to the motor 121, and the connecting portion 122 exposes from the case 110. The distance adjusting module 140 can further include an inserting portion 143 electrically connected to the circuit board 142 and corresponding to the connecting portion 122. The inserting portion 143 can include a plurality of pins, and the connecting portion 122 can include a plurality of pin holes corresponding to a plurality of wires of the motor 121, respectively. As the inserting portion 143 is inserted into the connecting portion 122, the circuit board 142 can be electrically connected to the motor 121 via the inserting portion 143 and the connecting portion 122, and can detect the elevating distance of the threaded shaft 200 in real-time. The distance adjusting module 140 can further include another inserting portion (not shown) configured to connect to an outer controller (not shown). The outer controller can receive the elevating distance of the threaded shaft 200 detected by the distance adjusting module 140 to stop the motor 121 according to a predetermined distance setting.

Precisely, the case 110 can further include an engaging groove 1101, the module housing 141 can further include an engaging tab 1141, and the shape of the engaging groove 1101 fits the shape of the engaging tab 1141. When the engaging tab 1141 is engaged with the engaging groove 1101, the distance adjusting module 140 is secured at the case 110, and the inserting portion 143 is inserted into the connecting portion 122 of the driving module 120 to complete the electric connection between the driving module 120 and the distance adjusting module 140. Finally, the module housing 141 can be secured at the case 110 by screws. If the user would like to remove the distance adjusting module 140, the screws can be unscrewed and the distance adjusting module 140 can be pulled out along the engaging groove 1101 to allow the inserting portion 143 to disengage from the connecting portion 122, thereby removing the distance adjusting module 140.

Figure 5:
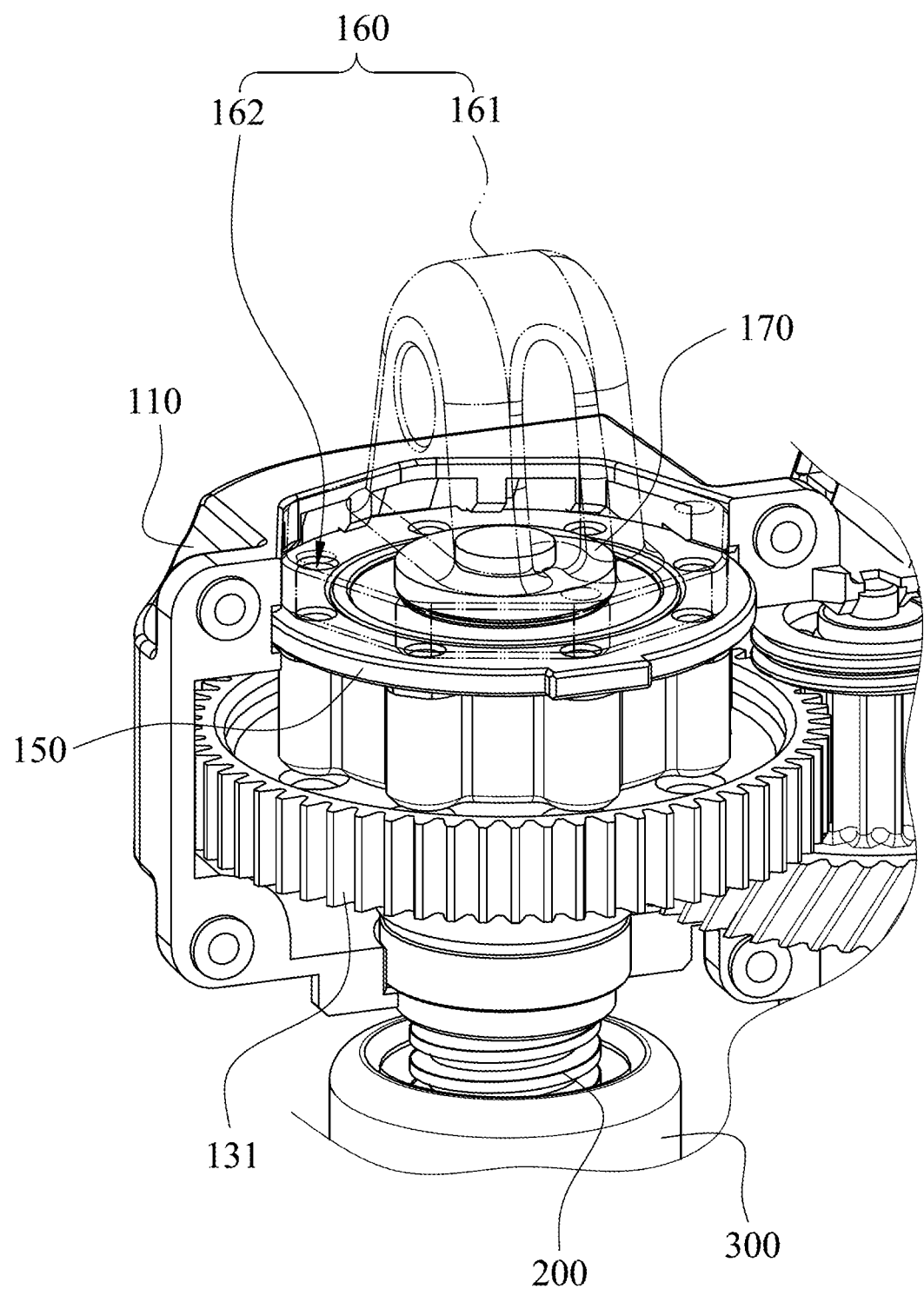
FIG. 5 shows a partial three-dimensional schematic view of the linear actuator of the embodiment of FIG. 1.

FIG. 5 shows a partial three-dimensional schematic view of the linear actuator 10 of the embodiment of FIG. 1. As shown in FIGS. 3 to 5, the semi-finished product 100 can further include a reinforcing seat 150 and an end cap 160. The reinforcing seat 150 is disposed within the case 110 and connected to the main gear 131. The reinforcing seat 150 includes a reinforcing seat body 151 and at least one installed hole 152 disposed on the reinforcing seat body 151. The reinforcing seat 150 can share the loads on the case 110 during an operation of the linear actuator 10. The end cap 160 is detachably connected to the reinforcing seat 150 and includes an end cap body 161 and at least one through hole 162 corresponding to the at least one installed hole 152 and configured for at least one fastening screw to screw therewith. The at least one fastening screw passes the at least one through hole 162 to screw with the at least one installed hole 152 so as to allow the end cap 160 to be secured at the reinforcing seat 150. In other embodiments, the case and the reinforcing seat can be combined in other methods, and the present disclosure is not limited thereto.

Figure 6:
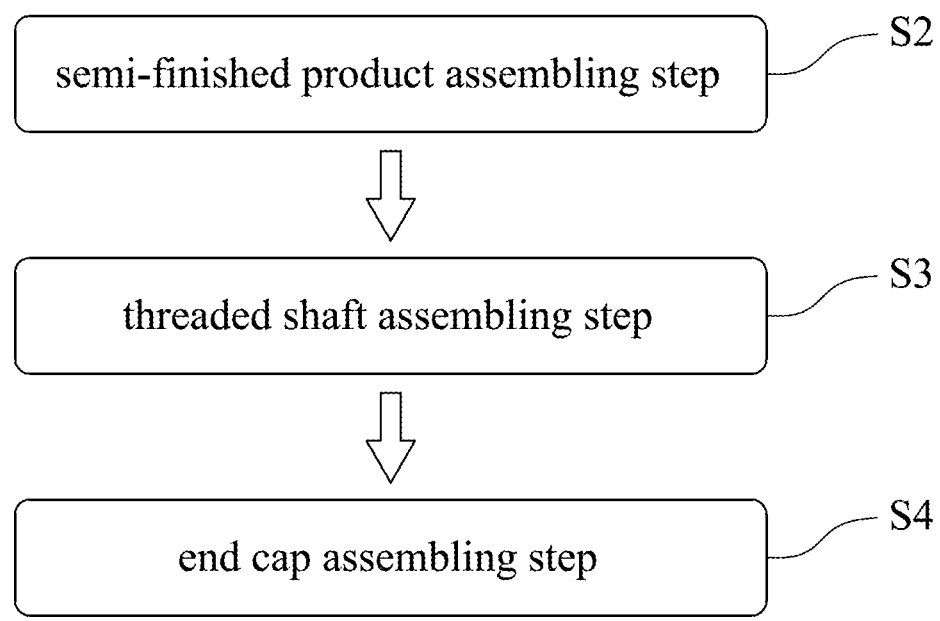
FIG. 6 shows a block diagram of a linear actuator assembling method according to another embodiment of the present disclosure.

FIG. 6 shows a block diagram of a linear actuator assembling method S1 according to another embodiment of the present disclosure. Please refer to FIG. 6 with references to FIGS. 1 to 5, the linear actuator assembling method S1 includes a semi-finished product assembling step S2 and a threaded shaft assembling step S3. The semi-finished product assembling step S2 is to form a semi-finished product 100, and the semi-finished product 100 includes a case 110, a main gear 131, and a main gear bearing 132. The main gear 131 and the main gear bearing 132 are surrounded and restricted by the case 110, and the main gear bearing 132 is sleeved on the main gear 131. In the threaded shaft assembling step S3, a threaded shaft 200 is reversely assembled, and one end of the threaded shaft 200 is inserted into the main gear 131 to allow the end of the threaded shaft 200 to be restricted by the main gear 131.

To be more specific, in the semi-finished product assembling step S2, a distance adjusting module 140 is allowed to be engaged with the case 110 and to be electrically connected to a driving module 120 of the semi-finished product 100, and therefore the distance adjusting module 140 is favorable for the user to quickly remove from or install into the case 110 for checking or changing purpose. In the threaded shaft assembling step S3, the end of the threaded shaft 200 is allowed to expose from the main gear 131, a spacer 170 is sleeved on the end of the threaded shaft 200, and then a punch riveting process is used to restrict the threaded shaft 200. In other embodiments, the threaded shaft can be restricted by the main gear via pins or key grooves to quickly assembled, and the present disclosure is not limited thereto. The other end of the threaded shaft 200 is configured to combine an elevating mechanism 300. The elevating mechanism 300 linked with the threaded shaft 200 can move linearly relative to the linear actuator 10. In other embodiments, the elevating mechanism can be modified to apply in other fields based on the demands, and the present disclosure is not limited thereto.

The semi-finished product 100 can further include a reinforcing seat 150 disposed within the case 110 and sleeved on the main gear bearing 132. The reinforcing seat 150 can further include at least one installed hole 152 corresponding to at least one opening 133 of the main gear 131. In the semi-finished product assembling step S2, a fixture (not shown) can be used to pass the at least one installed hole 152 and the at least one opening 133 to restrict a rotation of the main gear 131, and then the threaded shaft 200 is fastened therewith. Therefore, the installed hole 152 can be configured for the fixture to pass therethrough for restricting the main gear 131, and, in the later process, the installed hole 152 can be configured for an end cap 160 to fasten therewith. Moreover, the opening 133 on the main gear 131 is favorable for losing weight and decreasing cost, and the structure can have lots of functions.

Additionally, the linear actuator assembling method S1 can further include an end cap assembling step S4, and the end cap 160 is allowed to connect to the semi-finished product 100. Hence, the protection effect and the anti-dust effect can be achieved.

As described above, the present disclosure is to assemble the components other than the threaded shaft 200 into a semi-finished product 100, the threaded shaft 200 that is suitable for the demands can then be chosen and assembled by the user, and the assembling efficiency and convenience of the linear actuator 10 can be increased.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A linear actuator assembling method, comprising:
   a semi-finished product assembling step to form a semi-finished product, wherein the semi-finished product comprises a case, a main gear, a main gear bearing and a reinforcing seat, the main gear and the main gear bearing are surrounded and restricted by the case, the main gear bearing is sleeved on the main gear, the reinforcing seat is disposed within the case and is sleeved on the main gear bearing, and the reinforcing seat comprises at least one installed hole;
   a threaded shaft assembling step, wherein a threaded shaft is reversely assembled, and one end of the threaded shaft is moved along an axis of the threaded shaft from an outside of the case into an inside of the case to couple with the main gear inside the case to allow the end of the threaded shaft to be restricted by the main gear after the semi-finished product is formed; and
   an end cap assembling step, wherein an end cap comprises at least one through hole corresponding to the at least one installed hole, and at least one fastening screw passes the at least one through hole to screw with the at least one installed hole so as to allow the end cap to connect to the semi-finished product.

2. The linear actuator assembling method of claim 1, wherein, in the threaded shaft assembling step, the end of the threaded shaft is allowed to expose from the main gear, a spacer is sleeved on the end of the threaded shaft, and then a punch riveting process is used to restrict the threaded shaft.

3. The linear actuator assembling method of claim 1, wherein, in the semi-finished product assembling step, a distance adjusting module is allowed to be engaged with the case and to be electrically connected to a driving module of the semi-finished product.

4. The linear actuator assembling method of claim 1, wherein the at least one installed hole of the reinforcing seat corresponds to at least one opening of the main gear, in the semi-finished product assembling step, a fixture is used to pass the at least one installed hole and the at least one opening to restrict a rotation of the main gear, and then the threaded shaft is fastened therewith.

5. A linear actuator, assembled by the linear actuator assembling method of claim 1, the linear actuator comprising:
   the semi-finished product, comprising:
      the case defining an inner space;
      a driving module disposed within the inner space and comprising a motor; and
      a transmission module disposed within the inner space and comprising:
         the main gear driven by the motor; and
         the main gear bearing sleeved on the main gear; and
      the threaded shaft, wherein the end of the threaded shaft is inserted into and restricted by the main gear.

6. The linear actuator of claim 5, wherein the semi-finished product further comprises:
   a distance adjusting module detachably disposed at the case and comprising:
      a module housing; and
      a circuit board received in the module housing, wherein when the distance adjusting module is assembled with the case, the circuit board is electrically connected to the driving module.

7. The linear actuator of claim 6, wherein the case further comprises an engaging groove, the module housing further comprises a pair of engaging tabs, and when the engaging tabs are engaged with the engaging groove, the distance adjusting module is secured at the case, and an inserting portion is inserted into a connecting portion of the driving module.

8. The linear actuator of claim 5, wherein the semi-finished product further comprises:
   the reinforcing seat disposed within the case and connected to the main gear, the reinforcing seat comprising:
      a reinforcing seat body; and
      the at least one installed hole disposed on the reinforcing seat body; and
   the end cap detachably connected to the reinforcing seat and comprising:
      an end cap body; and
      the at least one through hole corresponding to the at least one installed hole and configured for the at least one fastening screw to screw therewith;
   wherein the at least one fastening screw passes the at least one through hole to screw with the at least one installed hole so as to allow the end cap to be secured at the reinforcing seat.

9. The linear actuator of claim 5, wherein the main gear comprises:
   an engaging hole having an inner thread configured for the threaded shaft to screw therewith.

10. The linear actuator of claim 7, wherein:
    the module housing comprises a top wall, two side walls, and a rear wall, and the two side walls and the rear wall extend downwardly from the top wall;
    one of the engaging tabs is formed extending inwardly from an inner surface of one of the two side walls, and the other one of the engaging tabs is formed extending inwardly from an inner surface of the other one of the two side walls; and
    the engaging tabs are engaged with the engaging groove by being inserted in the engaging groove.

11. The linear actuator of claim 7, wherein:
    the inserting portion is electrically connected to the circuit board, and comprises a plurality of pins disposed on the module housing of the distance adjusting module;
    the connecting portion is disposed on the driving module, is electrically connected to the motor of the driving module, and comprises a plurality of pin holes; and
    the pins of the inserting portion are inserted into the pin holes of the connecting portion.

* * * * *